United States Patent [19]

Amano et al.

[11] Patent Number: 4,849,780
[45] Date of Patent: Jul. 18, 1989

[54] INFORMATION SETTING DEVICE FOR CAMERA

[75] Inventors: Kenichiro Amano, Tokyo; Masayoshi Kiuchi, Kanagawa; Yoshihito Harada, Kanagawa; Ryuichi Kobayashi, Kanagawa; Masaharu Kawamura, Kanagawa, all of Japan

[73] Assignee: Canon Kabushiki Kaisha

[21] Appl. No.: 163,136

[22] Filed: Feb. 24, 1988

Related U.S. Application Data

[63] Continuation of Ser. No. 850,973, Apr. 11, 1986, abandoned.

[30] Foreign Application Priority Data

Apr. 15, 1985 [JP] Japan ................................. 60-079672

[51] Int. Cl.⁴ ............................................. G03B 17/18
[52] U.S. Cl. ................................................ 354/289.12
[58] Field of Search ............ 354/289.1, 289.11, 289.12

[56] References Cited

U.S. PATENT DOCUMENTS

4,529,291 7/1985 Mizogui ........................... 354/289.1

Primary Examiner—Michael L. Gellner
Attorney, Agent, or Firm—Toren, McGeady & Associates

[57] ABSTRACT

An information setting device for a camera comprises a plurality of manual operation switches for setting varied kinds of information. Among these switches, when a plurality of switches are simultaneously operated, there obtains a specific setting mode for setting information of a kind different from information of other kinds to be set by individually operating these switches. In the event of thus selecting the specific setting mode, this mode remains unchanged even when at least one of the simultaneously operated switches becomes inoperative.

24 Claims, 9 Drawing Sheets

| REGISTERS RA-RD | 4-BIT DATA | DATA FOR DISPLY BY DSP ||||
|---|---|---|---|---|---|
| | | SHUTTER TIME | ISO | CORRECTION | MULTIPLEX |
| 0 | 0000 | — | — | 0 | — |
| 1 | 0001 | 1 | 6 | 1 | 1 |
| 2 | 0010 | 2 | 12 | 2 | 2 |
| 3 | 0011 | 4 | 25 | | 3 |
| 4 | 0100 | 8 | 50 | | 4 |
| 5 | 0101 | 15 | 100 | | 5 |
| 6 | 0110 | 30 | 200 | | 6 |
| 7 | 0111 | 60 | 400 | | 7 |
| 8 | 1000 | 125 | 800 | | 8 |
| 9 | 1001 | 250 | 1600 | | 9 |
| A | 1010 | 500 | 3200 | | |
| B | 1011 | 1000 | 6400 | | |
| C | 1100 | — | — | | |
| D | 1101 | — | — | | |
| E | 1110 | — | — | -2 | |
| F | 1111 | 3 | — | -1 | |

FIG. 7

| FLAG | F0 | F1 | F2 | F3 |
|---|---|---|---|---|
| OUTPUT PORTS FOR DISPLAY | PI0 | PI1 | PI2 | PI3 |
| INTERNAL REGISTER | RA | RB | RC | RD |
| INITIAL VALUE | | 0 | 5 | 1 |
| MAX. VALUE | A | 2 | B | 9 |
| MIN. VALUE | 0 | E | 1 | 1 |

INFORMATION SETTING DEVICE FOR CAMERA

This is a continuation of application Ser. No. 850,973, filed Apr. 11, 1986, now abandoned.

BACKGROUND OF THE INVENTION

1. Field of the Invention

This invention relates to a mode setting display device for a camera.

2. Description of the Prior Art

There are varied modes of operation of cameras including, for example, an ISO film sensitivity data setting mode, an exposure correction value setting mode, a multiplex mode, a Tv priority mode, an Av priority mode, a program mode, etc. For selection of one of these varied modes as desired, the camera has been provided with mode setting devices which are arranged to effect mode selection in response to a manual operation performed on a push button or the like to turn on an applicable one of mode selection or setting switches corresponding to these varied modes. The mode selection arrangement of the conventional mode setting device however necessitates the provision of switches in combination with push buttons in onumbers corresponding to the number of varied modes. Meanwhile, cameras are in general trending to become smaller in size. Hence, the requirement for a great number of these push buttons and switches has been presenting a problem in finding space necessary for proper arrangement of them.

In a conceivable method for solving this problem, no switch is individually provided for a specific mode which is not often selected such as the multiplex mode and that mode is arranged to be selectable by simultaneously operating, in combination, a plurality of switches provided for other modes.

However, this method requires having the plurality of switches simultaneously pushed down into their operated states and kept in these states over a given period of time in selecting or setting the specific mode. Then, if one of them is allowed to turn off during the simultaneous manual operation on them, the device would shifts to some other mode. For example, in case that the multiplex mode is arranged to be selectable by simultaneously turning on both the setting switches provided for the ISO sensitivity data setting and exposure correction value setting modes, if one of these switches is inadvertently allowed to turn off during a multiplex mode selecting operation, the device shifts either to the ISO sensitivity data setting mode or to the exposure correction value setting mode.

SUMMARY OF THE INVENTION

This invention is directed to the solution of the problems mentioned in the foregoing. It is therefore an object of this invention to provide a mode setting device of the above-stated kind wherein, once a mode which is not often used such as the multiplex mode or the like is set by simultaneously turning on a plurality of mode setting switches, the selected mode is retained even one of the plurality of switches is inadvertently allowed to turn off during the process of the mode selecting operation.

It is another object of this invention to provide an information setting device which is arranged to shift to a setting mode for setting information of a specific kind when two or more information setting switches concurrently remain in their operated states at least over a given period of time.

These and further objects and features of this invention will become apparent from the following detailed description of a preferred embodiment thereof taken in connection with the accompanying drawings.

BRIEF DESCRIPTION OF THE DRAWINGS

FIG. 6 is an illustration showing displays to be made by the display circuit of FIG. 1.

DETAILED DESCRIPTION OF THE PREFERRED EMBODIMENT

Figure 1:
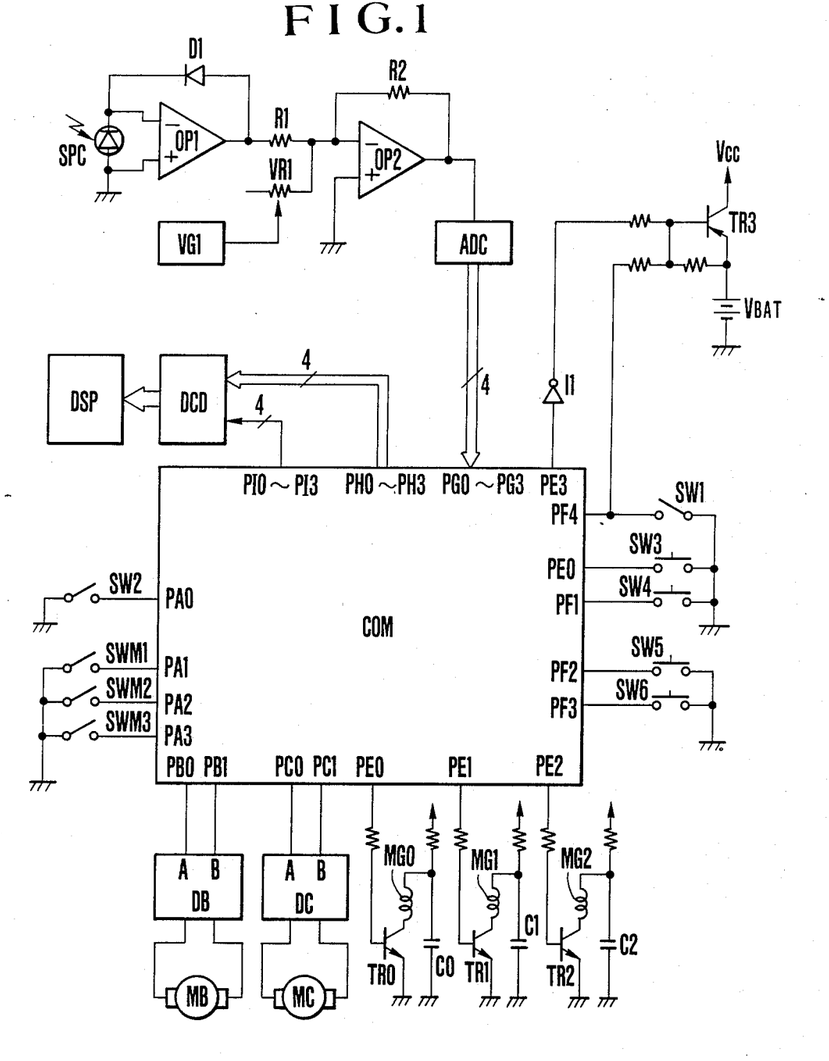
FIG. 1 is a circuit diagram showing a camera having a mode setting display device arranged according to this invention.

FIG. 1 shows a single-lens reflex camera having a mode setting display device arranged according to this invention as an embodiment example thereof.

The illustration includes a light receiving or photosensitive element SPC which is arranged to receive a light flux coming through a photo-taking lens. An operational amplifier OP1 is arranged to receive the output of the element SPC and is provided with a diode disposed in the feedback loop thereof. The operational amplifier OP1 thus forms a light measuring circuit which produces brightness information Bv of an APEX value corresponding to the logarithm of brightness of an object to be photographed.

The camera is provided with a variable resistor VR1 for setting a preset aperture value Av; a constant voltage circuit VG1; an operational amplifier OP2 which is arranged to perform a computing operation (Bv−Av) on the aperture value information or data Av and the brightness information or data Bv; and an analog-to-digital (A/D) conversion circuit ADC which converts the output of the operational amplifier OP2 into a digital value consisting of four bits.

A microcomputer COM has output port PI0 to PI3, PH0 to PH3, PB0, PB1, PC0, PC1, and PE0 to PE3 and input ports PG0 to PG3, PF0 to PF4 and PA0 to PA3. A switch SW1 is arranged to turn on in response to a first operated state (a first stroke or button touch) of a shutter release button. The switch SW1 is connected to the above-stated input port PF4 and also to the base of a transistor TR3. The transistor TR3 serves as a power supply switch and is arranged to supply the electric energy of a battery VBAT to each applicable circuit other than the microcomputer COM. A switch SW2 is connected to the input port PA0 and is arranged to turn on in response to a second operated state (a second stroke of a depressing operation) of the shutter release button. Switches SW4 and SW3 are arranged to turn on in response to operations on push buttons which are not shown. The switch SW3 is connected to the input port PF0 and serves as an ISO sensitivity data setting switch. The switch SW4 is connected to the input port PF1 and serves as an exposure correction value setting switch.

A data up switch SW5 is arranged to turn on in response to either a depressing operation on a push button (not shown) or a turn in one direction of a dial (not shown). A data down switch SW6 is arranged to turn on in response either to a depressing operation on a push button (not shown) or to a turn in the other direction of the above-stated dial. These switches SW5 and SW6 are connected to the input ports PF2 and PF3, respectively.

A switch SWM1 is connected to the input port PA1 and is arranged to turn on upon completion of a film feeding process. A switch SWM2 is connected to the input port PA2 and is arranged to turn on upon completion of a mirror uplifting process or a charging process on a mechanical system such as a shutter, a stop device, etc. A switch SWM3 is connected to the input port PA3 and is arranged to turn on upon completion of the travel of a trailing shutter curtain.

The above-stated input ports PG0 to PG3 are arranged to allow the output of the A/D conversion circuit ADC to enter the microcomputer COM. An inverter I1 is connected to the output port PE3. The output terminal of the inverter I1 is connected to the base of the above-stated transistor TR3.

A driving circuit DB is arranged to drive a motor MB to charge the above-stated mechanical system. The input terminals A and B of the driving circuit DB are connected to the output ports PB0 and PB1. A driving circuit DC is arranged to drive a motor MC to feed a film. The input terminals A and B of the driving circuit DC are connected to the output ports PC0 and PC1.

A transistor TR0 has the base thereof connected to the output port PE0 and forms a closed circuit in conjunction with a magnet MG0 and a capacitor C0. When the transistor TR0 turns on, the electric charge of the capacitor C0 flows to the magnet MG0. The magnet MG0 actuates a first clamping member which is not shown. A transistor TR1, which causes a mechanical release action of the camera to begin, has its base connected to the output port PE1 and is arranged to form a closed circuit in conjunction with a magnet MG1 and a capacitor C1. When the transistor TR1 is turned on, the electric charge of the capacitor C1 is discharged to the magnet MG1. The magnet MG1 then allows a leading shutter curtain to travel. A transistor TR2 has its base connected to the output port PE2 and is arranged to form a closed circuit for the magnet MG2 and a capacitor C2. When this transistor TR2 turns on, the electric charge of the capacitor C2 is discharged to the magnet MG2 to cause the trailing shutter curtain to travel. A display control circuit DCD is connected to the output ports PI0 to PI3 and PH0 to PH3 and is arranged to drive a display circuit DSP.

Figure 2:
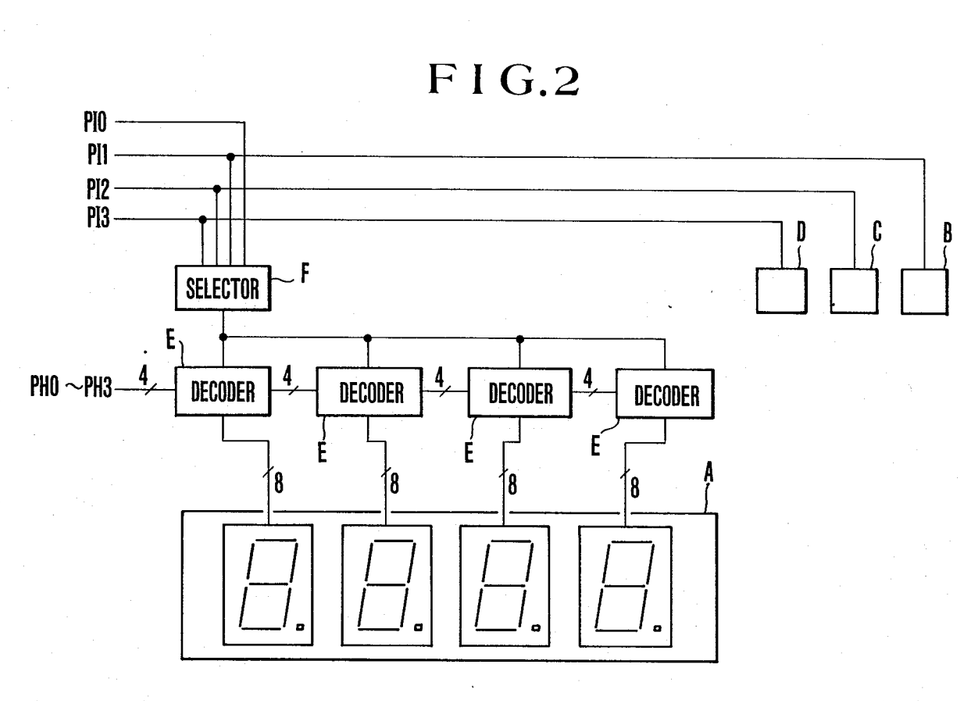
FIG. 2 is a diagram showing, by way of example, a display control circuit DCD and a display circuit DSP shown in FIG. 1.

FIG. 2 shows, by way of example, the arrangement of the display circuit DSP and the display control circuit DCD. Referring to FIG. 2, a selector F designates the kind of display data for a decoder E according to input signals coming from the output ports PI0 to PI3 and causes the decoder E to correlate the display data coming via the output ports PH0 to PH3 with display values. The display circuit DSP consists of display devices A, B, C and D. The display device A is, for example, a seven-segment display device for numerically displaying data while other display devices B, C and D are arranged to diplay the kinds of the display data.

Figure 3:
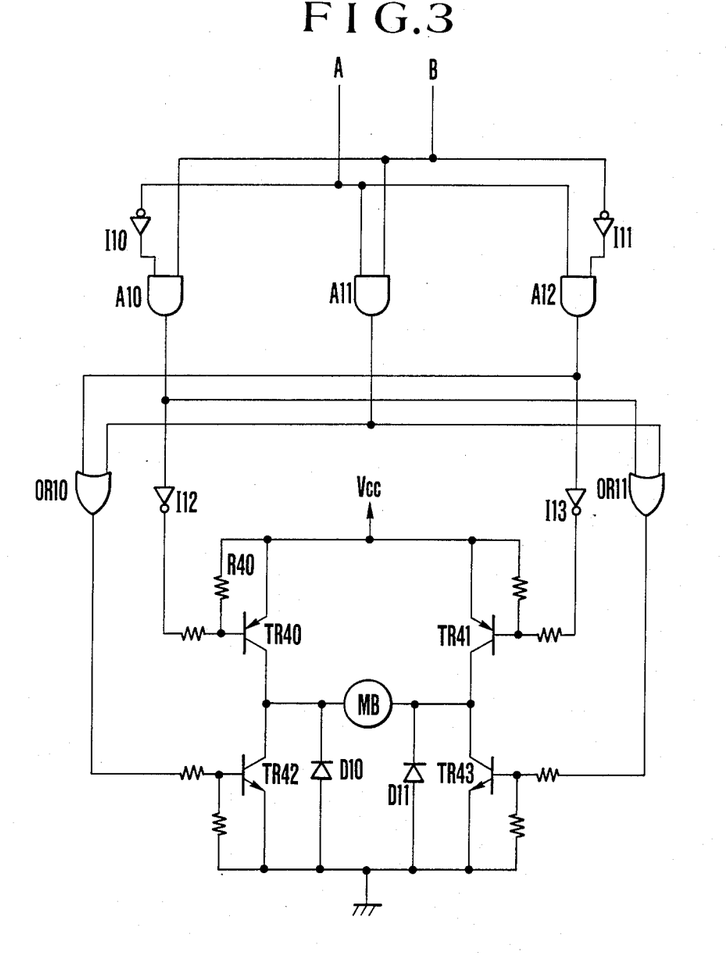
FIG. 3 is a circuit diagram showing by way of example, a driving circuit DB shown in FIG. 1.

FIG. 3 is a circuit diagram showing, by way of example, the arrangement of the driving circuit DB of FIG. 1. The illustration includes inverters I10, I11, I12 and I13; AND gates A10, A11 and A12; OR gates OR10 and OR11; diodes D10 and D11; transistors TR40, TR41, TR42 and TR43; and a motor MB. The details of this circuit are omitted from description here. The transistors TR41 and TR42 turn on when an input A is at "1" and another input B is at "0". Then the motor MB is caused by the transistors TR41 and TR42 to rotate for the above-stated charging operation. In case that the input A is at "0" and the input B at "1", the transistors TR40 and TR43 turn on to cause the motor MB to rotate in the direction reverse to the rotating direction of the above-stated instance. When both the inputs A and B are at "1", the transistors TR42 and TR43 turn on to apply braking to the motor MB. If both the inputs A and B are at "0", all the transistors turn off. Further, the driving circuit DC is also arranged in the same manner as the circuit DB.

Figure 7:
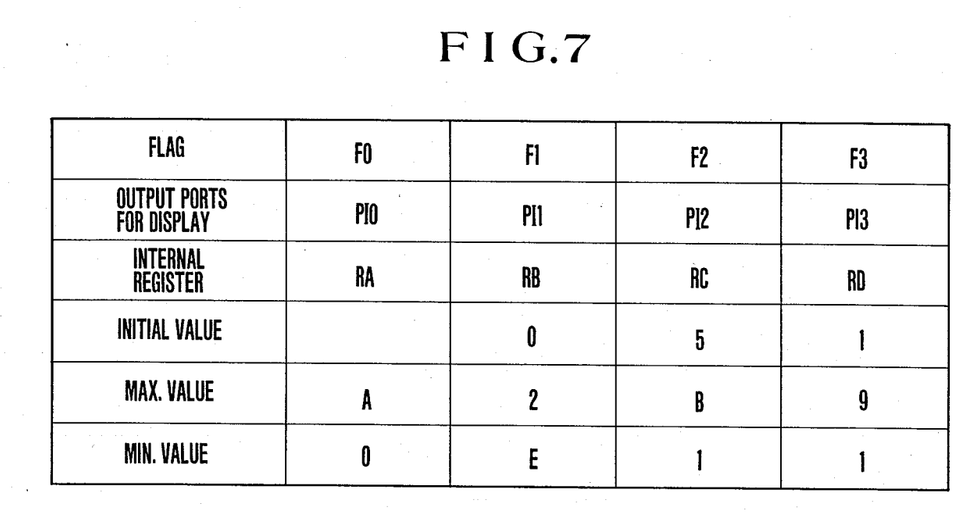
FIG. 7 is an illustration of the operation of a microcomputer shown in FIG. 1.

FIG. 6 shows the relation between the contents of the internal registers RA to RD of the microcomputer COM and the display values to be displayed by the display device A. FIG. 7 shows the relation of the interval flags F0 to F3 of the microcomputer COM to the registers and the output ports and also the relation of an initial, maximum and minimum values to these flags.

Figures 4, 4A:
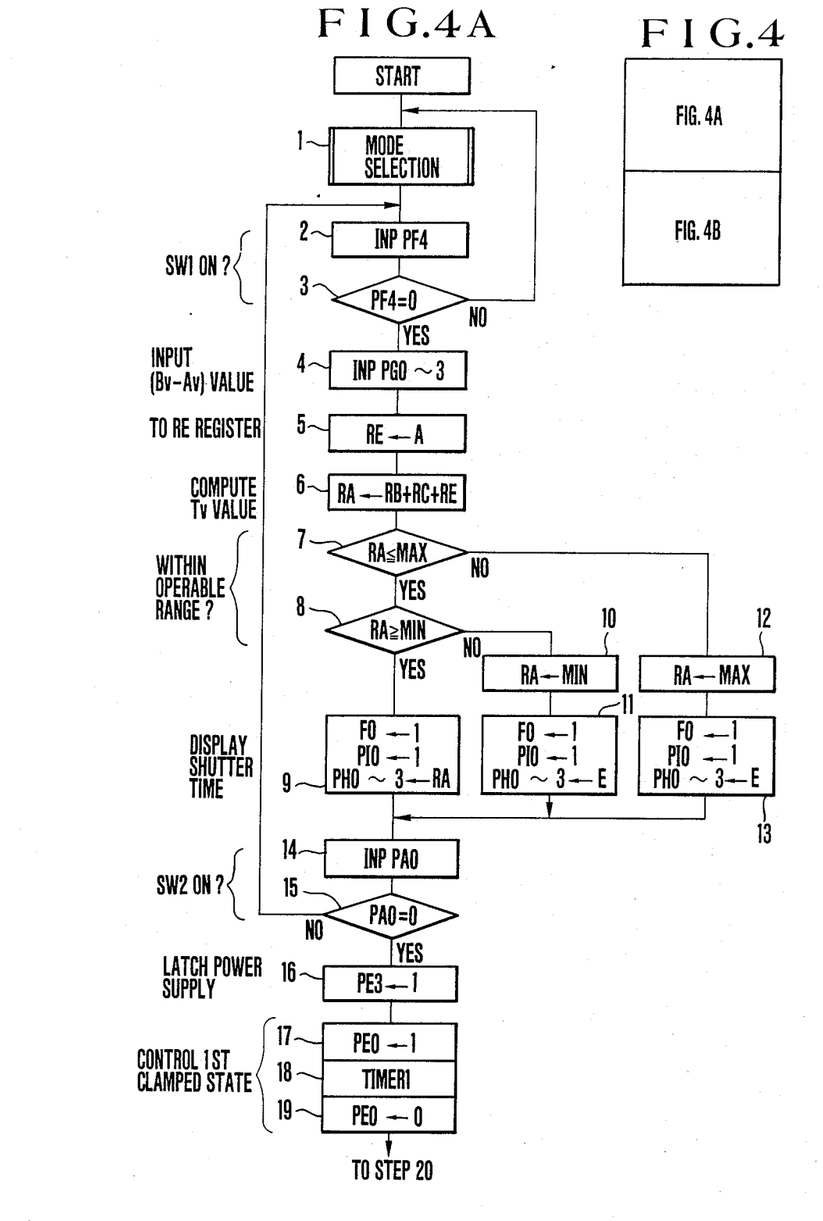
FIGS. 4, 4A, 4B, 5, 5A and 5B are flowcharts showing the operation of the embodiment of this invention.
Figure 4B:
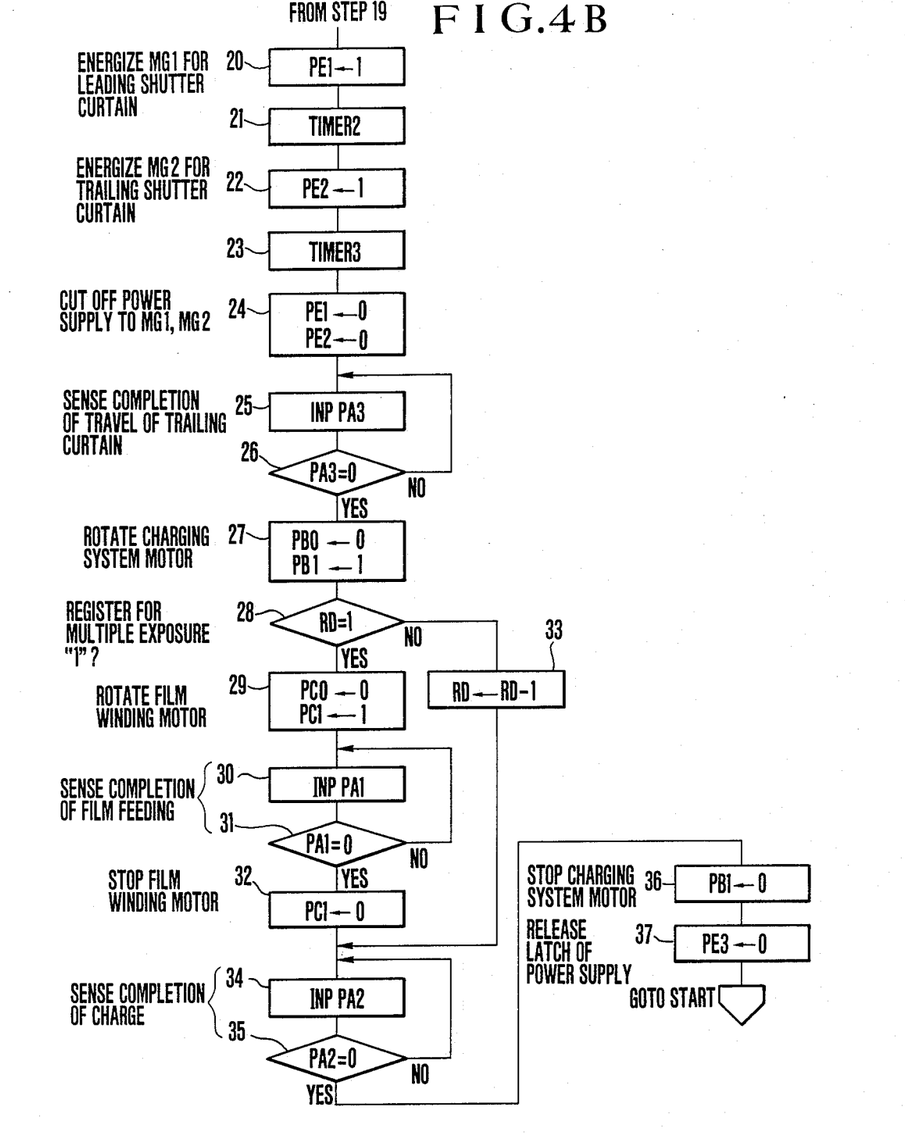
Figures 5, 5A:
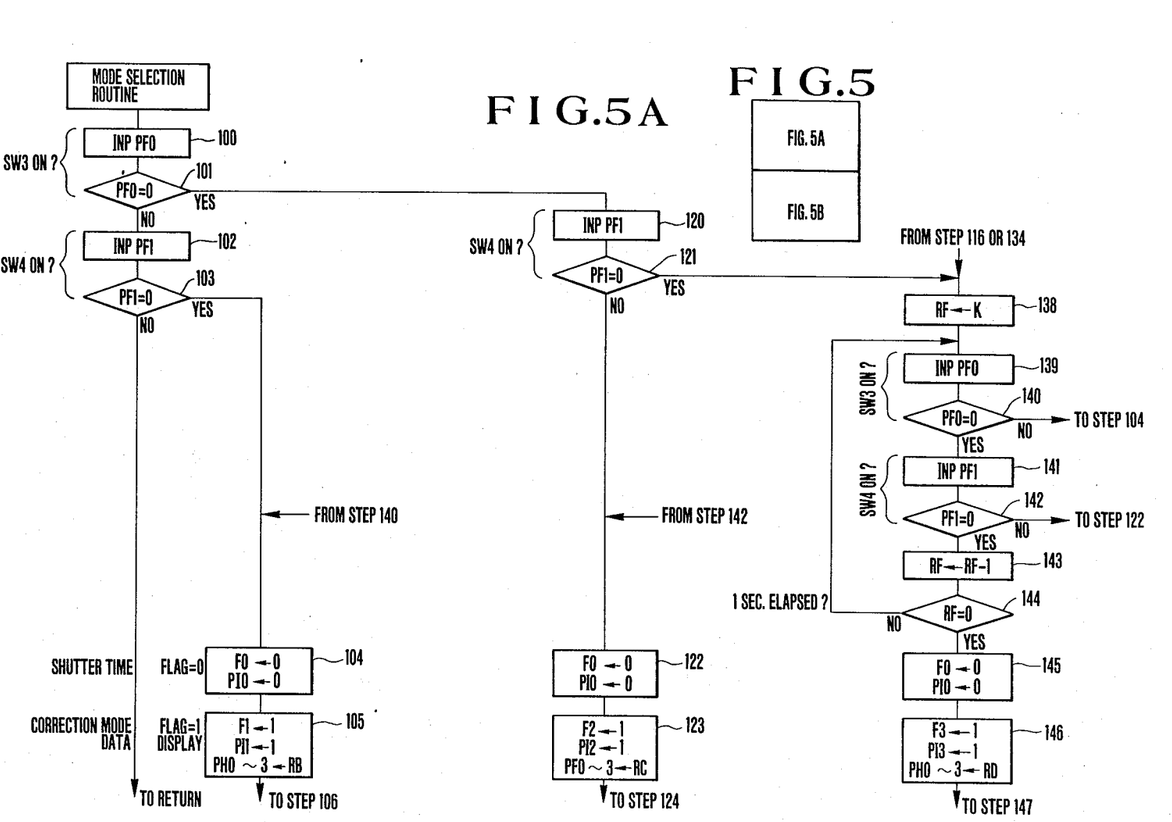
Figure 5B:
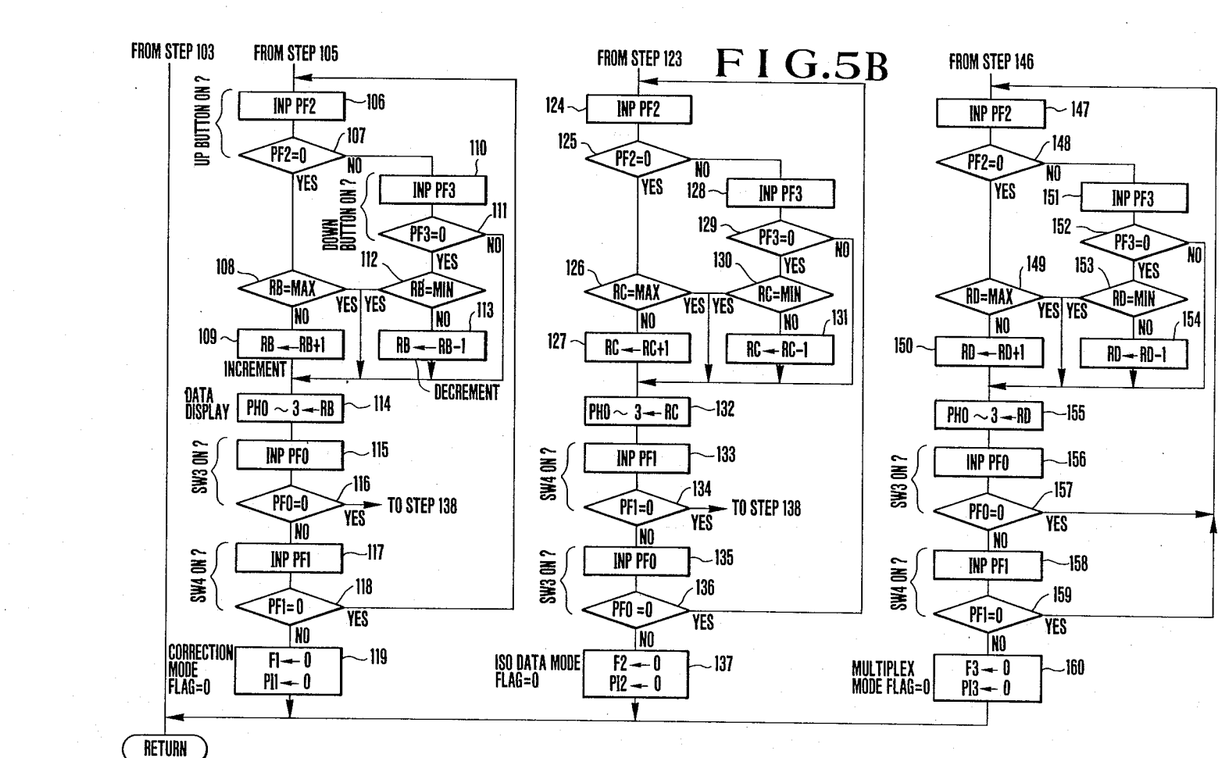

Referring now to FIGS. 4 and 5 which are flowcharts, the embodiment of this invention operates as follows: The microcomputer COM begins to operates when a power supply is effected when a main switch, which is not shown, turned on. A program contained in the microcomputer COM has an address No. 0 designated by a power-on-reset circuit when the main switch is turned on. The program then begins to be carried out from the No. 0 address. At that time, all the flags and output ports become zero. With the program thus started, operation steps 1 to 37 are performed one by one as described below with reference to FIG. 4:

Step 1: This is a mode selection routine to be carried out with the mode selection switches SW3 and SW4 operated. The details of this step are as will be described later herein.

Step 2: The state of the switch SW1, is detected via the state of the input port PF4 of the microcomputer COM.

Step 3: A check is made for a state of PF4= 0, i.e. to find whether the switch SW1 has been turned on by the first stroke of the shutter release button. If the switch SW1 is found on, the operation proceeds to the step 4 as in that case the input port PF4 has been detected to have a low level ("0") input at the previous step 2. With the switch SW1 having turned on, the transistor TR3 is turned on. Then, a voltage Vcc from the battery VBAT is also supplied to each of applicable circuits other than the microcomputer (hereinafter referred to as the mi-com) COM. If the switch SW1 is found off, this indicates that the input port PF4 has been found at the step 2 to have received a high level ("1") input and there obtains a state of PF4=1. In that event, the power supply is effected to no circuit except the mi-com COM and the operation comes back to the step 1. Then, the steps 1, 2 and 3 are repeated until the switch SW1 comes to be found on.

Step 4: Inputs received at the input ports PG0 to PG3 are taken into the mi-com COM. Then, since the light receiving element SPC is connected to the input terminal of the operational amplifier OP1 and the compression diode D1 to the feedback circuit, logarithmically compressed data Bv appears at the output terminal of the operational amplifier OP1 in the form of a voltage according to the brightness of an object to be photographed. Meanwhile, the aperture setting data Av is obtained via a variable resistor VR1 from a setting member which is not shown. The operation amplifier OP2 then performs a computing operation Bv−Av on the data Bv and Av. Therefore, at the output terminal of the operational amplifier OP2, there appears a voltage corresponding to a value Bv−Av. The output of the amplifier OP2 is supplied to the A/D converter ADC to be converted into a digital value of four bits. This digital value is transferred to the input ports PG0 to PG3. The mi-com COM thus obtains the A/D converted value (Bv−Av) from the input ports PG0 to PG3.

Step 5: The data thus obtained is stored at an internal register RE.

Step 6: Within the mi-com COM, an adding operation is performed on film sensitivity data Sv and exposure correction value data CMP which are supplied from the mode selection switches SW5 and SW4 and the data input switches SW5 and SW6 to registors RB and RC together with the data Bv−Av stored at the register RE. As a result of this computation Bv−Av+Sv+CMP=Tv, a shutter time data Tv is obtained. The data Tv thus obtained is stored at a register RA.

Step 7: The register RA is checked. If the data stored at the register RA is found not exceeding a maximum value, the operation proceeds to the step 8. If it is found exceeding the maximum value, the operation proceeds to the step 12. The maximum value is set at a sexadecimal value A corresponding to a shutter time value of 1/1000 sec. The operation proceeds to the step 12 if the result of the above-stated computation is a shorter time value than 1/1000 sec. and to the step if it is longer than 1/1000 sec.

Step 8: The value of the data stored at the register RA is checked. If the value is found to be above a minimum value, the operation proceeds to the step 9. If the value is less than the minimum value, the operation proceeds to the step 10. The minimum value is set at a value 0 corresponding to a shutter time value of one sec. The operation proceeds to the step 9 if the data value is shorter than one sec. and to the step 10 if it is longer than one sec. At the steps 7 and 8, the operation is allowed to proceed to the step 9 only when the shutter time value is found to be within the operable range from one sec. to 1/1000 sec.

Step 9: This step 9 is a display routine. To have the shutter time data displayed, the flag F0 becomes "1" and an output "1" is produced to the output port PI0. Further, the content of the shutter time data storing register RA is also produced to the output ports PH0 to PH3. Signals from these output ports are supplied to the display driving circuit DCD. The circuit DCD is arranged as shown in FIG. 2. The circuit DCD is composed of the selector F which selects the data to be displayed; and decoders E which are arranged to convert the display data into segment data. Each of these decoders E consists of known AND and OR gates. A four-bit digital value produced from the output ports PH0 to PH3 is in a relation to the display data as shown in FIG. 6. In the case of the shutter time data, the four-bit data takes one of values 0000 to 1010. Since the value of the output port PI0 alone becomes "1" among these output ports PI0 to PI3, the selector F informs the decoders E that the data produced from the output ports PH0 to PH3 is indicative of the shutter time. Thus, a shutter time value, corresponding to the data of the output ports PH0 to PH3, is displayed at the display device A. Further, if the computed value is found to be exceeding one sec. at the step 8, the above-stated minimum value MIN (one sec.) is set at the register RA at the step 10. Then, at the step 11, the flag F0 is set at "1" to produce a signal "1" at the output port PI0. Further, a value E of the sexadecimal notation is produced at the output ports PH0 to PH3. Then, in the same manner as at the step 9, the display device A is caused to display the value E as a warning. In case that the computed value is found to be shorter than 1/1000 sec. at the step 7, the above-stated maximum value MAX (1/1000 sec.) is set at the register RA at the step 12. Then, at the step 13, the display device A is caused to display the value E as a warning in a manner similar to the step 11.

Following the display operation, the step 14 and steps subsequent thereto are performed.

Step 14: The state of the input port PA0 is checked.

Step 15: If the input port PA0 is found to be PA0=0 at the step 14, i.e. if the switch SW2 is thus found ON with the shutter release button pushed to its second stroke, the processes of the step 16 and steps subsequent thereto are performed. In the event of PA0= 1, i.e. if the switch SW2 is found OFF, the operation goes back to the step 3 and the processes described in the foregoing are repeated until the switch SW2 comes to be found ON.

Step 16: A signal "1" is produced at the output port PE3 of the mi-com COM to cause thereby the output of the inverter I1 at become "0". This turns on the transistor TR3. After that, even if the switch SW1 turns off, the power supply is latched to allow the power supply to be continuously effected until the process of the step 37.

Step 17: A signal "1" is produced at the output port PE0 of the mi-com COM. The transistor TR0 is turned on. Then, the capacitor C0 which is charged with a voltage which is about equal to the voltage Vcc of the power source begins to supply electric energy to the first clamping combination magnet MG0.

Step 18: The operation awaits the lapse of a given period of time after the step 17.

Step 19: A signal "0" is produced at the output port PE0 of the mi-com COM. As a result, the power supply to the magnet MG0 is cut off. A first clamped state is cancelled with the power supply effected to the magnet MG0 through the steps 17, 18 and 19. This allows the camera to perform stopping down and mirror uplifting processes in a known manner.

Step 20: A signal "1" is produced at the output port PE1 of the mi-com COM. The transistor TR1 is turned on by this. As a result, a power supply begins to be effected to the magnet MG1 for the leading shutter curtain. This allows the leading curtain to travel and an exposure begins.

Step 21: The Tv data stored at the shutter time data register RA is real time counted on the basis of a real-time expanded shutter time value. The operation proceeds to the step 22 upon completion of this shutter time counting process.

Step 22: A signal "1" is produced at the output port PE2 of the mi-com COM. By this, the transistor TR2 is turned on to allow a power supply to the magnet MG2 for the trailing shutter curtain.

Step 23: To obtain a period of time necessary before the trailing shutter curtain begins to travel after commencement of power supply to the magnet MG2, a timer is arranged to count that time. The trailing curtain travels to complete an exposure.

Step 24: A signal "0" is applied to the output ports PE1 and PE2 of the mi-com COM. The transistors TR1 and TR2 turn off to bring the power supply to the magnets MG1 and MG2 to an end.

Step 25: The input port PA3 of the mi-com COM is checked.

Step 26: If the result of the check is PA3=0 indicating that the switch SWM3 has turned on in response to completion of the travel of the trailing shutter curtain, the operation proceeds to the step 27. In the event of PA3=1, the operation goes back to the step 25. In other words, at the steps 25 and 26, again a check process is performed to see if the travel of the trailing curtain has been completed. After detection of completion of the travel, the operation proceeds to the step 27.

Step 27: A signal "0" is produced at the output port PB0 and a signal "1" at the output port PB1 of the mi-com COM. As a result, the charging motor MB is caused to rotate via the motor driving circuit DB. A charging process is performed on the shutter, the mirror and the stop.

Step 28: The content of the register RD for multiplex exposure data is detected. The operation proceeds to the step 29 if the content is 1 and to the step 33 if it is 2 or more.

Step 29: A signal "0" is produced at the output port PC0 and a signal "1" at the output port PC1 of the mi-com COM. This causes the film feeding motor MC to rotate via the motor driving circuit DC.

Step 30: The input port PA1 of the mi-com COM is checked.

Step 31: If the input port PA1 is found to be PA1=0 indicating that the switch SWM1 is on after completion of a film feeding process, the operation proceeds to the step 32. In the event of PA1=1, the operation comes back to the step 30. Again the input port PA1 is checked. Then, upon detection of completion of the film feeding process, the operation shifts to the step 32.

Step 32: A signal "0" is produced at the output PC1 of the mi-com COM to bring the film feeding motor MC to a stop. Thus, if the content of the register RD is at "1", the charging process is performed on the shutter, etc. after completion of an exposure and a film feeding process is also accomplished. Further, in the event that the value of the content of the register RD is found to be 2 or more than 2 at the step 28, i.e. in the event of a multiplex exposure, the operation proceeds to the step 33 without performing the film feeding process.

Step 33: With the value of the register RD for multiplex exposure found to be at least 2, content or value of the register is decreased by 1 without performing the film feeding process.

Step 34: The input port PA2 of the mi-com COM is checked.

Step 35: If the result of the check made at the step 34 is PA2=0 indicating that the switch SWM2 is ON with the charging process having been performed on the shutter, the mirror and the stop, the operation proceeds to the step 36. In the event of PA2=1, the operation comes back to the step 34. At the steps 34 and 35, a check is made to see if the charging process on the mechanical system has been completed. Upon detection of completion, the operation shifts to the step 36. Further, the timing for the charging process is arranged to have the switch SWM1 turn on always prior to the switch SWM2.

Step 36: A signal "0" is produced at the output port PB1 of the mi-com COM to bring the rotation of the charging motor MB to a stop.

Step 37: A photo-taking sequence of operations come to an end at the step 36. Therefore, a signal "0" is produced to the output port PE3 of the mi-com COM. In response to this, the output of the inverter I1 becomes "1" to turn off the transistor TR3. As a result, the power supply to all the parts except the mi-com COM comes to a stop. Upon completion of the process of this step 37, the operation again shifts to the No. 0 address of the program. Then, the program is carried out again from the step 1. Such being the arrangement, photographing can be continuously performed as long as the shutter release button is continuously pushed down.

As mentioned in the foregoing, film feeding is not performed if the content of the register RD is found to be 2 or more at the step 28. In that event, another exposure is effected on the same frame portion of the film during a next photographing operation to have a multiplex exposure. The multiplex exposure is performed a number of times in a repeating manner until the content of the register RD becomes 1. In other words, the multiplex exposure is repeated a number of times set at the register RD for the multiplex exposure.

Next, the mode selecting routine of the step 1 shown in FIG. 4 is performed in a manner as shown in the flowchart of FIG. 5. Referring to FIG. 5, this routine begins with a step 100 as described below:

Step 100: The input port PF0 of the mi-com COM is checked.

Step 101: If the result of the check made at the step 100 is PF0=0 indicating that the ISO sensitivity data selection button switch SW3 is ON, the operation goes to a step 120. If it is PF0=1, the operation proceeds to a next step 102. Let us now assume that the switch SW 3 is OFF and the operation proceeds to the step 102.

Step 102: The input port PF1 is checked.

Step 103: If the result of this check is PF1=0 indicating that the exposure correction data selection button switch SW4 is ON, the operation proceeds to a step 104. If it is PF1=1, the operation shifts to the step 2 of FIG. 4. In other words, if no data setting operation has been performed, no data is set by this routine and the operation shifts to the step 2. However, if the switch SW4 is found ON, a next step 104 and steps subsequent thereto are performed.

Step 104: The shutter time flag F0 and te output port PI0 of the mi-com COM are respectively set at "0".

Step 105: To have correction data displayed, the flag F1 of the mi-com COM is set at "1" and a signal "1" is produced at the output port PI1. This causes the display device B to light up thus indicating that a correction mode has obtained. Further, the content of the correction data register RB is produced at the output ports PH0 to PH3. Then, the selector F supplies each of the decoders E with a signal indicating that the data thus produced is correction data. The decoders E convert this signal and the signal from the output ports PH0 to PH3 into display data. This causes the display device A to light up. Further, the register RB is arranged to store data "0" which represents a correction value 0 as an initial storing value.

Step 106: The input port PF 2 of the mi-com COM is checked.

Step 107: If the result of the check made at the step 106 is PF2=0 indicating that the information or data input setting switch SW5 is pushed, the operation proceeds to a step 108. If it is PF2=1, the operation shifts to a step 110.

Step 108: The content of the register RB is checked to see if it is equal to a maximum value MAX. If so, the operation shifts to a step 114. If not, the operation shifts to a step 109. This maximum value MAX is set at 2 of the sexadecimal notation. In case that the exposure correction value stored at the register RB is set at a value for +2 steps, the operation shifts to a step 114. If it is not set at that value, the operation proceeds to a step 109. In the latter case, the operation is as follows:

Step 109: The value of the register RB is increased by 1. As a result, the correction value set at the register RB is increased by +1 step. Further, in case that the input port PF2 is found to be at PF2=1 at the step 107 indicating the OFF state of the switch SW5, the process of a step 110 is performed in place of those of the steps 108 and 109.

Step 110: The input port PF3 of the mi-com COM is checked.

Step 111: If the result of the check is PF3=0 indicating that the switch SW6 is being pushed, the operation proceeds to a step 112. If it is PF3=1, the operation jumps to a step 114. Let us here assume that the switch SW6 is pushed into an ON state and the operation proceeds to the step 112.

Step 112: The operation shifts to a step 114 if the value of the register RB is found to be equal to a minimum value MIN or proceeds to a step 113 if it is not. Therefore, if the data of the register RB is set the minimum correction value (−2 steps, corresponding to E of sexadecimal notation), the operation immediately shifts to the step 114. If not, the operation proceeds to the step 113. Then, at the step 113, the value of the content of the register RB is decreased by 1 to have the correction value decreased by 1.

Through these steps 106 to 113, the correction value is increased by 1 when the up switch SW5 is pushed and is decreased by 1 when the down switch SW6 is pushed. In case that the correction value is set either at the maximum value MAX (+2 steps) or at the minimum value MIN (−2 steps), the correction value is inhibited from being further increased or decreased even if these switches SW5 and SW6 are ON.

With the correction value having been set in the manner as described above, the operation proceeds to the step 114.

Step 114: The data of the register RB is produced at the output ports PH0 to PH3 of the mi-com COM. The correction value set at the register RB is displayed at the display device A concurrently with the process of a next step 115.

Step 115: The input port PF0 of the mi-com COM is checked.

Step 116: If the result of the check made at the step 115 is PF0=0 indicating the ON state of the switch SW3, the operation jumps to a step 138. If it is PF0=1, the operation proceeds to a step 117. Let us now assume that the switch SW3 is OFF and the operation proceeds to the step 117.

Step 117: The input port PF1 of the mi-com COM is checked.

Step 118: If the result of the check is PF1=0 indicating that the switch SW4 is ON, the operation comes back to the step 106. Then, the content of the register RB is renewed by turning on the switch SW5 or SW6 for setting the correction value in the same manner as described above. If the result of the check is PF1=1, the operation proceeds to a step 119.

Step 119: A signal "0" is produced at the flag F1 and the output port PI1 of the mi-com COM. This causes the display devices A and B to put out the light thereof. Following this, the operation shifts to the step 2 of FIG. 4. Then, the correction value setting and display processes come to an end.

In case that, at the steps 100 and 101 of the mode selection routine, the switch SW3 is found to be ON, i.e. if the ISO (film sensitivity value) setting switch is found to be in an ON state, the process of a step 120 follows the step 101.

Step 120: The input port PF1 of the mi-com COM is checked.

Step 121: If the result of the check is PF1=0 indicating an ON state of an exposure correction selecting button switch SW4, the operation shifts to a step 138. If it is PF1=1, the operation proceeds to a next step 122. Now, the switch SW4 is assumed to be OFF and the operation to proceed to the step 122.

Step 122: The flag F0 and the output port PI0 are set at "0".

Step 123: The flag F2 is set at "1" and a signal "1" is produced at the output port PI2. The display device C then lights up and makes a display indicating that the ISO film sensitivity setting mode has obtained. Meanwhile, the content of the ISO data register RC is produced at the output ports PH0 to PH3. This causes the selector F to send to the decoders E a signal indicative of that the display value represents ISO film sensitivity information. Accordingly, the decoders E convert input data into ISO sensitivity data and cause the display device A to display the data. Further, the register RC is arranged to have its initial value at 5 of sexadecimal notation. Therefore, the display device A displays an ASA (ISO) value 100. Following this, the process of steps 124 to 137 are performed. The details of these steps are similar to the steps 106 to 119 and, therefore, are omitted from the following description. For these steps, the maximum value MAX is set at B of sexadecimal notation (corresponding to ISO 6400) and the minimum value MIN at 1 of sexadecimal notation (corresponding to ISO 6). In the event that the register RC is found to have been set at the ISO value of 6400 or 6 at the steps 126 and 130, the set value is inhibited from being further increased or decreased even if the switch SW5 or SW6 is turned on. Further, at the steps 127 and 131, like in the case of setting the correction value, the content of the register RC is increased or decreased by 1 by turning on the switch SW5 or SW6 to shift the ISO sensitivity data step by step to have a desired ISO sensitivity data set at the register RC. At the step 132, the content of the register RC is displayed by the display device A to show the ISO sensitivity value thus set.

At the steps 133 and 134, when the switch SW4 turns on during the process of setting the above-stated ISO sensitivity data, the operation shifts to a step 138. If the switch SW3 is found to have turned on at the steps 135 and 136, the ISO data is again renewed. In that event, the ISO data setting process continues until the switch SW3 comes to turn off in the same manner as in the case of the setting operation on the above-stated correction value.

During the mode selecting routine, when both the switches SW3 and SW4 are turned on, the embodiment operates as follows: In this instance, a state of PF0=0 obtains at the step 101 and a state of PF1=0 at the step 121. The operation, therefore, shifts to the step 138 and, after that, the processes of the step 138 and steps subsequent thereto are carried out as described below:

Step 138: A constant K is set at the register RF.

Step 139: The input port PF0 of the mi-com COM is checked.

Step 140: If the result of the check is PF0=0 indicating that the ISO sensitivity data selection button switch SW3 is ON, the operation proceeds to a step 141. If it is PF0=1 indicating that the switch SW4 alone is ON. It is assumed that the correction mode is selected and the operation jumps to the step 104. Now assuming that the switch SW3 is kept in its ON state, the operation is performed as follows:

Step 141: The input port PF1 of the mi-com COM is checked.

Step 142: If the result of the check is PF1=0 indicating that the correction data selection button switch SW4 is ON, the operation proceeds to a step 143. If it is PF1=1 thus indicating that the switch SW3 alone is ON, the operation jumps to the step 122 on the assumption that the ISO made is selected. Assuming that the switch SW4 is now kept ON, the operation proceeds to the step 143.

Step 143: The data stored at the register RF is decreased by 1.

Step 144: If the content of the register RF is then zero, the operation proceeds to a next step 145. If not, the operation goes back to the step 139. In the latter case, the steps 139 to 144 are repeatedly carried out until the content of the register RF becomes zero. The length of time during which the processes of these steps are repeated K times to have the content of the register RF become zero is set at about one second. The operation is thus arranged to proceeds to a step 145 only when both the switches SW3 and SW4 are found to be continuously ON for a period of at least one second. These steps 138 to 144 are provided for making a discrimination between that these switches SW3 and SW4 are both inadvertently turned on by the photographer and that both of them are intentionally turned on. In setting the ISO sensitivity data by turning on the switch SW3 or in setting a correction value by turning on the switch SW4, if both of them are turned on by mistake, the operation shifts to the above-stated correction value setting step or to the ISO data setting step if one of them is turn allowed to off before the lapse of one second. Therefore, either the correction value or the ISO data can be set as desired. In case that both the switches are intentionally turned on at the same time for the purpose of setting the multiplex mode, the operation proceeds to the step 145 as the photographer intentionally keeps the two switches ON for a period of time at least one second.

Step 145: The flag F0 is set at "0". A signal "0" is produced from the output port PI0.

Step 146: The flag F3 is set at "1". A signal "1" is produced from the output port PI3. This causes the display device D to light up indicating the selection of the multiplex mode. At the same time, a signal indicative of that the data to be displayed represents the number of repeating times of multiplex exposure is supplied via the selector F to the decoders E. Therefore, the decoders E cause the display device A to display the number of multiplex exposure repeating times on the basis of the input data. Further, the content of the register RD is transferred via the output ports PH0 to PH3 of the mi-com COM to the decoders E in displaying the above-stated number of times. The initial value of the register RD is arranged to be 1 of sexadecimal notation and the display device A displays it as 1.

Following the above, steps 147 to 155 are carried out in a manner similar to the steps 106 to 114 of setting the correction value described in the foregoing. Therefore, the details of the steps 147 to 155 are omitted from the following description. At these steps, the number of multiplex exposure repeating times is set with the content of the register RD increased or decreased one by one according as the switch SW5 or SW6 is turned on while this is displayed at the display device A. In the multiplex mode, the maximum value MAX and the minimum value MIN at the steps 149 and 153 are, respectively, 9 and 1 of sexadecimal notation. Therefore, the number of multiplex exposure repeating times is set within the range from 1 to 9 according as the content of the register RD is adjusted between 1 and 9. After completion of the incremental or decremental adjustment of the content of the register RD with the switch SW5 or SW6, steps 155 to 159 are carried out.

These steps 155 to 159 are similar to the above-stated steps 115 to 118 for the correction value setting processes. The switches SW3 and SW4 are checked. If either of them is found ON, the operation comes back to the step 147. In that event, the content of the register RD is renewed for setting the number of multiplex exposure repeating times through the steps 147 to 154 until both these switches come to turn off. When both the switches SW3 and SW4 turn off during the multiplex exposure repeating time setting process, the operation shifts to a step 160. At the step 160, the flag F3 is set at "0" and a signal "0" is produced from the output port PI3. This causes the display devices A and D to put out their lights. The multiplex exposure setting operation comes to an end and the operation shifts to the step 2.

In the case of the multiplex mode of the steps 138 to 160, this mode is recognized only when both the switches SW3 and SW4 remain ON over a predetermined period of time. Therefore, in cases where both the switches are simultaneously turned on by mistake, the embodiment does not shift to this mode. This arrangement effectively prevents an erroneous shift to the multiplex mode due to an inadvertent switch operation.

Further, after selection of the multiplex mode, this mode is retained as long as one of the switches SW3 or SW4 is ON. Therefore, even if one of them is inadvertently turned off during a setting process in the multiplex mode, the embodiment remains in that mode, so that the operability of the camera can be improved according to the invented arrangement.

In the embodiment described, during a correction value setting operation or ISO data setting operation through one of the switches SW3 and SW4, if one of the switches is turned on along with the other switch, the embodiment shifts to the step 138 which enables the operation to shift to the multiplex mode. Then, during the processes of further steps 139 to 144, if one of the switches is allowed to turns off, the embodiment promptly shifts to the correction value setting mode or the ISO data setting mode. This arrangement greatly facilitates the mode selecting operation.

The embodiment is arranged on the assumption that the multiplex mode is not often employed. However, in place of the multiplex mode, the ISO data setting mode or the exposure correction value setting mode may be arranged as the mode not to be often employed. In that instance, the specific mode may be arranged to be selectable by simultaneously pushing a plurality of switches among, for example, the Tv priority mode, Av priority mode and program mode selecting switches, etc. in place of the ISO data and correction value setting mode selecting switches.

In the embodiment, the multiplex mode is designated when two switches for individual selection of different modes are simultaneously turned on. However, one of these individual mode selection switches may be replaced with a cyclic switch which is arranged to designate, for example, one of the Tv priority, Av priority and program photographing modes, etc. every time it turns on and the multiplex mode may be arranged to be selectable by turning this cyclic switch together with another switch, for example, with the ISO data setting mode selection switch.

In the case of the embodiment described, this invention is applied to a camera of the aperture priority type. However, this invention is not limited to the camera of that type but is also applicable to cameras of other types, such as a shutter priority camera or a two priority camera having the so-called multi-exposure mode.

Further, with the selected the multiplier mode selected, the embodiment is arranged to recognize this mode when a plurality of switches concurrently remain ON over a predetermined period of time. This arrangement may be modified as follows: With the two switches simultaneously turned on, even when one of the switch is turned off after the shift to the multiplex mode is displayed by the display device, the mode remains unchanged. This modification becomes possible by omitting the steps 138 to 144 of FIG. 5.

The embodiment is arranged to select each mode by turning on an applicable selection switch. This arrangement may be changed to make each mode selectable by turning off the applicable switch instead of by turning it on.

With this invention applied to an apparatus of the kind having two selection switches simultaneously turned on in selecting a specific mode which is not often used, the specific mode which is thus selected can be retained without keeping one of the two simultaneously operated selection switches in a continuously operated state. Therefore, even if one of these switches is inadvertently allowed to turn off during a data setting process in the specific mode, the data setting process can be carried out under the same condition. This is a great advantage in terms of the operability of the apparatus of this kind.

What is claimed is:

1. An information setting device for a camera, comprising:
   (a) a first manual operation switch for setting first information;
   (b) a second manual operation switch for setting second information; and
   (c) an information setting circuit which assumes a first setting mode for setting said first information in response to the operation of said first manual operation switch and a second setting mode for setting said second information in response to the operation of said second manual operation switch, said circuit being arranged to assume a third setting mode for setting third information which differs from said first and second information when said first and second manual operation switches are simultaneously operated and to retain said third information setting mode even if either one of said first and second manual operation switches is brought into an inoperative stated during a process of setting said third information.

2. A device according to claim 1, wherein said first manual operation switch is provided for setting ISO film sensitivity data; said second switch for setting a photographing mode; and said third information is multiplex.

3. A device according to claim 1, wherein said information setting circuit is arranged to cease to retain said third setting mode when all said switches operated in setting said third setting mode come to take inoperative states.

4. An information setting device according to claim 1, wherein said information setting deice includes a renewal switch for renewal contents of respective informations in said first, second and third modes.

5. A camera having an information setting device for setting information of varied kinds through the operation of a plurality of switches including at least first and second manual operation switches to be used for setting first and second information, comprising:
   (a) detecting means for detecting an operation performed simultaneously on a plurality of switches including at least said first and second manual operation switches; and
   (b) control means for causing said information setting device to set third information when said simultaneous operation on said switches is detected by said detecting means, said information setting device being arranged to carry out a setting action on said third information even when at least one of said switches comes to take an inoperative state during said setting action on said third information.

6. A device according to claim 5, wherein said first manual operation switch is provided for setting ISO film sensitivity data; said second switch for setting a photographing mode; and said third information is multiplex.

7. A device according to claim 5, wherein said information setting circuit is arranged to cease to retain said third setting mode when all said switches operated in setting said third setting mode come to take inoperative states.

8. An information setting device for a camera, comprising:
   (a) a plurality of manual operation switches including a first manual operation switch for setting first information; and
   (b) an information setting circuit which shifts to first information setting mode for setting said first information in response to a manual operation performed on said first manual operation switch, said circuit being arranged to shift to a second information setting mode when, among said plurality of manual operation switches, a plurality of switches are simultaneously operated and to retain said second information setting mode even if one of said plurality of simultaneously operated switches is released from the operated state thereof while said circuit is shifting to said second information setting mode.

9. A device accoding to claim 8, wherein said information setting circuit is arranged to cease to retain said second information setting mode when all said switches used for shifting said circuit to said second information setting mode come to take inoperative states.

10. An information setting device according to claim 8, wherein said setting device includes a renewal switch for renewing contents of respective information in said first and second modes.

11. An information setting device for a camera, comprising:
 (a) a first manual operaion switch;
 (b) a second manual operation switch; and
 (c) an information setting circuit which assumes a first setting mode for setting first information in response to the operaion of said first manual operation switch and a second setting mode for setting said second information in response to the operation of said second manual operation switch, said circuit being arranged to assume a third setting mode for setting a third information when said first and second manual operation switches are simultaneously operated, said setting circuit including control means for shifting the mode of said setting circuit to said third setting mode when both said first and second switches continue to be in a operated state longer than a predetermined time, said control means including timer means for counting the predetermined time with a detection that said first switch and said second switch are brought into states of operation, during the time counting of said timer means the switching state of said first and said second switches being continuously or repeatedly detectable and when at least one of said first and second switches is shifted into a non-operated state a mode-shifting to a third setting mode from other modes is prohibited.

12. A device according to claim 11, wherein said first manual operation switch is provided for setting ISO film sensitivity data; said second switch for setting a photographing mode; and said third information is multiplex.

13. A device according to claim 11, wherein said information setting circuit is arranged to cease to retain said third setting mode when all said switches operated in setting said third setting mode come to take inoperative states.

14. A device according to claim 11, wherein when one of the first and second manual operation switches is placed in an inoperative state before the predetermined period of time elapses after said first and second manual operation switches are concurrently placed in the operated states thereof, the device is shifted to an information setting mode corresponding to the other switch in the operative state.

15. a device according to claim 11, wherein said information setting device has a timer circuit which is activated as said first and second switches are simultaneously operated and makes a time counting of said predetermined period of time, and when one or both of said switches is placed in an inoperative state during said time counting by said timer circuit, the shifting to the third mode is prohibited.

16. An information setting device for a camera, comprising:
 (a) a plurality of manual operation switches including a first manual operation switch for setting first information
 (b) an information setting circuit which shifts to a first information setting mode for setting said first information in response to a manual operation performed on said first manual operation switch, said circuit being arranged to shift to a second information setting mode when, among said plurality of manual operation switches, a plurality of switches are simultaneously operated; and
 (c) said setting circuit including control means for shifting the mode of said setting circuit to said second information setting mode when all of said simultaneously operated switches continue to be in an operated state longer than a predetermined period of time, said control means including timer means for counting the predetermined time with a detection that the plurality of switches are simultaneously operated, during the time counting of said timer means the state of said simultaneously operated switches being continuously or repeatedly detectable and when at least one of said switches is shifted into a non-operated state a mode shift to the second information setting mode form other modes is prohibited.

17. A device according to claim 16, wherein said information setting circuit is arranged to cease to retain said second information setting mode when all said switches used for shifting said circuit to said second information setting mode come to take inoperative states.

18. An information setting device according to claim 16, wherein said setting device includes a renewal switch for renewing contents of respective informations in said first and second modes.

19. An information setting device according to claim 16, wherein said timer means detects the repeated time of detections of said switch, and continues to count the time until the number of repeatedly detection times reaches a predetermined number of times.

20. An information setting device for a camera, comprising:
 (a) a plurality of manual operation switches;
 (b) an information setting circuit which assumes one of varied information setting modes according to the manually operates states of said switches, said setting circuit being arranged to take a specific information setting mode when, among said plurality of manual operation switches, a plurality of switches are simultaneously operated; and
 (c) said setting circuit including control means for shifting the mode of said setting circuit to said specific information setting mode when all of said simultaneously operated switches continue to be in an operated state longer than a predetermined period of time, said control means including timer means for counting the predetermined time with a detection that said plurality of switches are simultaneously brought into an operated state, during the time counting of said timer means the state of the simultaneously operated switches being continuously or repeatedly detectable, and when at least one of the simultaneously operated switches is shifted into a non-operated state a mode shift to the specific information setting mode from other modes is prohibited.

21. A device according to claim 20, wherein said information setting circuit is arranged to cease to retain said specific information setting mode when all said switches used for shifting said circuit to said specific information setting mode come to take inoperative states.

22. An information setting device according to claim 20, wherein said setting device includes a renewal switch for renewing contents of informations in respective modes.

23. A information setting device according to claim 20, wherein said timer means detects the repeated times of detections of said switch, and continues to count the time until the repeated number of detection times reaches a predetermined number of times.

24. An information setting device for a camera, comprising:
   (a) a first manual operation switch for setting first information;
   (b) an information setting circuit which shifts to a first information setting mode for setting said first information in response to a manual operation performed on said first manual operation switch, said circuit being arranged to shift to a second information setting mode when, among said plurality of manual operation switches, a plurality of switches are simultaneously operated; and
   (c) said setting circuit including control means for shifting the mode of said setting circuit to said second information setting mode when all of said simultaneously operated switches continue to be in an operated state longer than a predetermined period of time, said control means including timer means for counting the predetermined time with a detection that the plurality of switches are simultaneously operated, during the time counting of said timer means the state of said simultaneously operated switches being continuously or repeatedly detectable and when at least one of said switches is shifted into a non-operated state a mode shift to the second information setting mode from other modes is prohibited.

* * * * *